United States Patent
Engel

(10) Patent No.: US 9,453,718 B2
(45) Date of Patent: Sep. 27, 2016

(54) ILLUMINATION MODULE FOR A COORDINATE MEASURING MACHINE

(71) Applicant: Carl Zeiss Industrielle Messtechnik GmbH, Oberkochen (DE)

(72) Inventor: Thomas Engel, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 14/524,433

(22) Filed: Oct. 27, 2014

(65) Prior Publication Data

US 2015/0043013 A1    Feb. 12, 2015

Related U.S. Application Data

(63) Continuation of application No. PCT/EP2012/058394, filed on May 7, 2012.

(51) Int. Cl.
*G01B 11/00* (2006.01)
*G02B 21/06* (2006.01)
(Continued)

(52) U.S. Cl.
CPC ......... *G01B 11/005* (2013.01); *G01B 11/007* (2013.01); *G02B 6/0001* (2013.01); *G02B 21/06* (2013.01); *G02B 21/082* (2013.01)

(58) Field of Classification Search
CPC  G01B 11/005; G01B 11/007; G02B 21/082; G02B 6/0001; G02B 21/06; G02B 6/001; F21K 9/00–9/90; F21V 5/004; F21V 5/02; F21Y 2103/006; F21Y 2103/022
USPC .......................................... 362/253; 356/614
See application file for complete search history.

(56) References Cited

U.S. PATENT DOCUMENTS 5,038,258 A  *  8/1991  Koch et al. .................... 362/237
5,210,399 A  *  5/1993  Maag et al. ................... 250/202
(Continued)

FOREIGN PATENT DOCUMENTS

CN   102338626 A   2/2012
CN   202140891 U   2/2012
(Continued)

OTHER PUBLICATIONS

International Search Report for PCT/EP2012/058394 (in English and German), mailed Oct. 5, 2012; ISA/EP.
(Continued)

*Primary Examiner* — Laura Tso
*Assistant Examiner* — Naomi M Wolford
(74) *Attorney, Agent, or Firm* — Harness, Dickey & Pierce, P.L.C.

(57) ABSTRACT

An illumination module for a coordinate measuring machine for measuring a workpiece by means of an optical sensor, wherein the illumination module comprises a main body having a sensor side and a workpiece side, wherein the illumination module comprises on the main body at least one illumination arrangement for illuminating the workpiece, and wherein the at least one illumination arrangement has an emission characteristic with a specific emission angle and a light intensity profile within the emission angle, wherein the light intensity profile of the at least one illumination arrangement within the emission angle is asymmetrical. The present invention furthermore relates to a coordinate measuring machine comprising such an illumination module.

22 Claims, 9 Drawing Sheets

(51) Int. Cl.
*F21V 8/00* (2006.01)
*G02B 21/08* (2006.01)

(56) References Cited

U.S. PATENT DOCUMENTS

| | | | | |
|---|---|---|---|---|
| 6,061,184 | A | * | 5/2000 | Zehetner ............... G02B 21/084 359/642 |
| 6,454,438 | B1 | * | 9/2002 | Wada ........................... 362/268 |
| 6,948,825 | B2 | | 9/2005 | Christoph |

FOREIGN PATENT DOCUMENTS

| | | |
|---|---|---|
| DE | 10 2004 022 314 A1 | 12/2005 |
| DE | 10 2006 018 410 A1 | 10/2007 |
| DE | 10 2009 009 599 A1 | 8/2010 |
| EP | 0 362 625 A2 | 4/1990 |
| EP | 0 385 262 A2 | 9/1990 |
| EP | 0 969 304 A2 | 1/2000 |
| EP | 1 373 827 B1 | 10/2009 |
| JP | 2004-529383 | 9/2004 |

OTHER PUBLICATIONS

English Translation of International Preliminary Report on Patentability (Chapter II of the Patent Cooperation Treaty) for PCT/EP2012/058394 with 16 page annex (along with German language version), completion date Jun. 20, 2014, mailing date by IB Nov. 13, 2014; IPEA/EP.

Office Action with Search Report (with English language translation) for corresponding Chinese case dated Jun. 29, 2015; 11 pp.

* cited by examiner

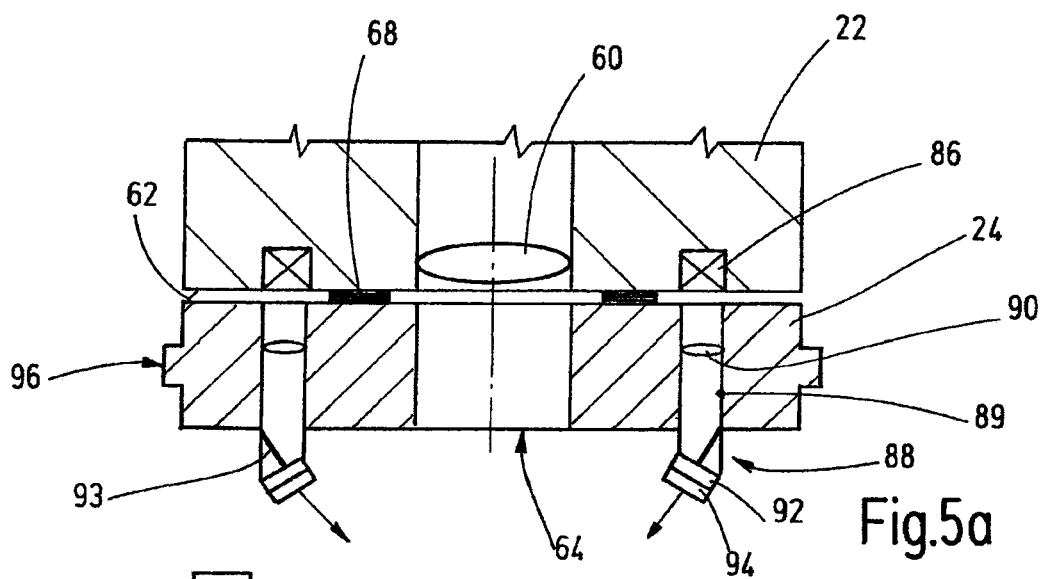
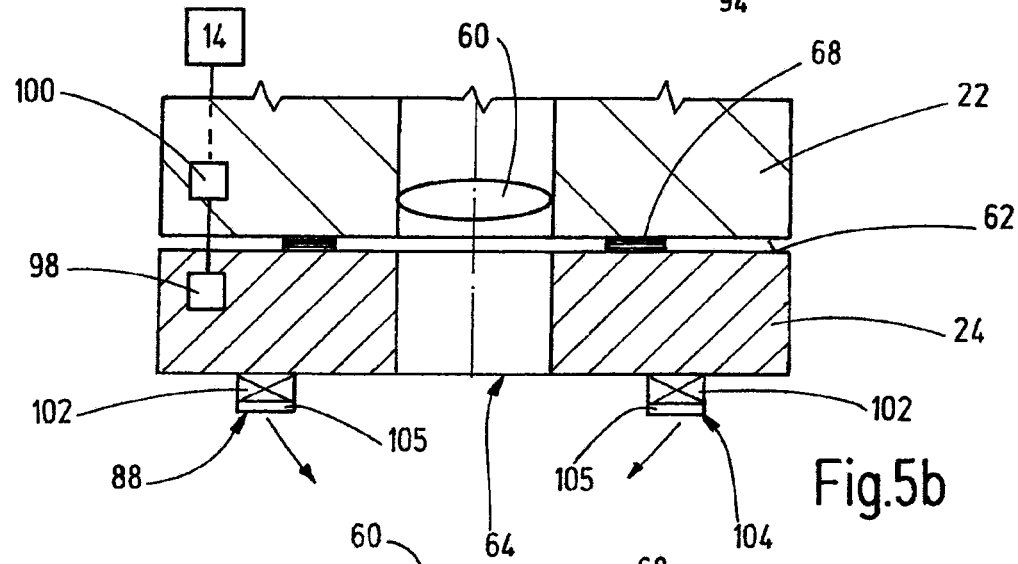
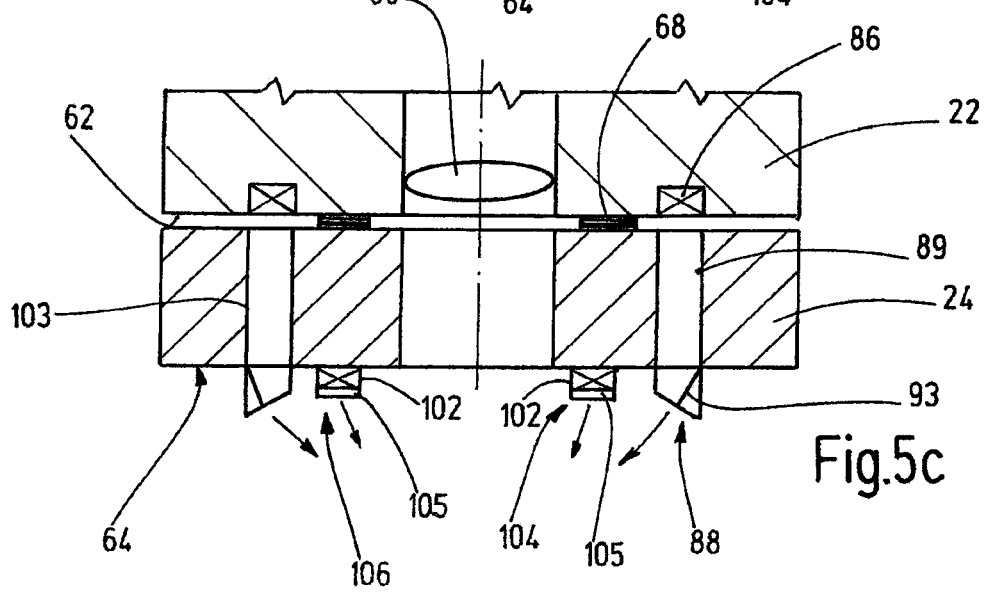

ILLUMINATION MODULE FOR A COORDINATE MEASURING MACHINE

CROSS-REFERENCE TO RELATED APPLICATIONS

This is a Continuation application of International patent application PCT/EP2012/058394, filed May 7, 2012.

BACKGROUND OF THE INVENTION

The present invention relates to an illumination module for a coordinate measuring machine for measuring a workpiece by means of an optical sensor, wherein the illumination module comprises a main body having a sensor side and a workpiece side, wherein the illumination module comprises on the main body at least one illumination arrangement for illuminating the workpiece, and wherein the at least one illumination arrangement has an emission characteristic with a specific emission angle and a light intensity profile within the emission angle.

In accordance with a second aspect, the present invention relates to a coordinate measuring machine for measuring a workpiece by means of an optical sensor.

Coordinate measuring machines are generally known in the prior art. They serve to check workpieces in the context of quality assurance, for example, or to determine the geometry of a workpiece completely in the context of so-called "reverse engineering". Furthermore, diverse further application possibilities are conceivable.

In such coordinate measuring machines, various types of sensors can be employed in order to set the coordinates of a workpiece to be measured. By way of example, sensors that effect tactile measurement are known for this purpose, such as are sold for example by the applicant under the product designation "VAST", "VAST XT" or "VAST XXT". In this case, the surface of the workpiece to be measured is probed with a probe pin whose coordinates in the measurement space are continuously known. Such a probe pin can also be moved along the surface of a workpiece, such that in such a measuring process in the context of a so-called "scanning method" a multiplicity of measurement points can be detected at defined time intervals.

Furthermore, it is known to use optical sensors which enable the coordinates of a workpiece to be detected contactlessly. One example of such an optical sensor is the optical sensor sold by the applicant under the product designation "ViScan".

The sensors can then be used in various types of measurement set-ups. One example of such a measurement set-up is the product "O-INSPECT" from the applicant. In such a machine, both an optical sensor and a tactile sensor are used to carry out different inspection tasks on one machine and ideally with a single clamping of a workpiece to be measured.

Sensor systems having optical sensors are becoming increasingly important in coordinate measuring technology. In this case, optical sensors are distinguished in particular by a high speed of the measuring process. In this way, many inspection tasks for example in medical technology, plastics technology, electronics and precision mechanics can be carried out. It goes without saying that, furthermore, various other set-ups are also conceivable.

Traditionally, the optical sensor head or the optical sensor is connected to a carrier system that supports and moves the optical sensor system. Various carrier systems are known in the prior art, for example gantry systems, stand, horizontal arm and arm systems, and all kinds of robot systems. In this case, the carrier systems can furthermore have system components that enable the sensor head to be positioned as flexibly as possible. One example thereof is the rotary-pivoting articulated joint from the applicant sold under the designation "RDS". Furthermore, various adapters can be provided in order to connect the different system components of the carrier system among one another and to the sensor system.

Furthermore, in coordinate measuring technology it is customary that different types of illumination can be applied when measuring objects. The corresponding optical sensors then have a video camera and/or a photographic camera and a corresponding illumination for the workpiece. Furthermore, a fixed imaging optics is provided, which images the workpiece to be measured onto the camera or the optical sensors of the camera. In this case, specific optical sensors with fixedly integrated illuminations and imaging optics are generally provided for each application or each type of measurement.

By way of example, the document EP 0 362 625 A2 shows an exchangeable front optics for an optical probe head. Said front optics is designed for a specific working distance and a specific type of illumination. Furthermore, it comprises the entire lens that images light rays reflected from the workpiece onto the optical sensor.

However, on account of the optical elements for imaging, such a front optics is relatively heavy and has a relatively large volume. Furthermore, such a front optics can be used only for one specific application, i.e. at one specific working distance and for one specific type of illumination.

Furthermore, the documents EP 0 385 262 A2 and EP 1 373 827 B1 likewise specify illumination devices for coordinate measuring machines which firstly comprise imaging optics and secondly comprise illumination elements of relatively complex design, for example pivotable or movable illumination elements, in order to set the illumination to different wavelength distances. However, this also results in a relatively complex construction of such illumination elements and a possibly higher weight and volume, which, on account of the higher inertia associated therewith, makes it more difficult to regulate the optical sensor head, particularly during rapid measuring processes.

Depending on the workpiece to be examined and the measuring method employed by means of the optical sensor, the workpiece can be illuminated in various ways. In this case, by way of example, a working distance at which the measuring process is performed can vary. Furthermore, an illumination at different angles of incidence on a surface of the workpiece may be desired under certain circumstances. Therefore, in practice, either illumination modules can be exchanged or an illumination module comprises a plurality of alternately switchable light sources in order to provide the different types of illuminations. However, such arrangements firstly make an illumination module heavier and secondly increase the costs of an illumination module. However, it is desirable, in principle, to be able to provide more types of illuminations by means of an illumination module, i.e. illuminations at different working distances and/or at different angles of incidence.

BRIEF SUMMARY OF THE INVENTION

Therefore, it is an object of the present invention to specify an illumination module for a coordinate measuring machine with an optical sensor which is constructed in a simple manner and enables the greatest possible flexibility in the use of the optical sensor of the coordinate measuring machine, in particular a use of different working distances.

In accordance with a first aspect, it is therefore provided an illumination module for a coordinate measuring machine for measuring a workpiece by means of an optical sensor, wherein the illumination module comprises a main body having a sensor side and a workpiece side, wherein the illumination module comprises on the main body at least one illumination arrangement for illuminating the workpiece, and wherein the at least one illumination arrangement has an emission characteristic with an emission angle and a light intensity profile within the emission angle, wherein the light intensity profile of the at least one illumination arrangement within the emission angle is asymmetrical.

According to a second aspect, there is provided an illumination module for a coordinate measuring machine for measuring a workpiece by means of an optical sensor, wherein the illumination module comprises a main body having a sensor side and a workpiece side, wherein the illumination module comprises on the main body at least one illumination arrangement for illuminating the workpiece, and wherein the at least one illumination arrangement has an emission characteristic with an emission angle and a light intensity profile within the emission angle, wherein the light intensity profile of the at least one illumination arrangement within the emission angle is asymmetrical, wherein in that the emission characteristic of each illumination arrangement is modulated in such a way that it has a first partial region and a second partial region, wherein there is a shadow region between the first partial region and the second partial region, and wherein the first partial regions of the at least one illumination arrangement coincide in a first working region and second partial regions of the at least one illumination arrangement coincide with a second working region, and in that the at least one illumination arrangement has in each case at least one optical element which modulates the emission characteristic of the respective illumination arrangement.

The radiation intensity of a light source is the proportion of the total radiation power of the light source in a given spatial direction in an arbitrarily small solid angle element. The radiation power as SI unit is thus specified as $$I = \frac{d\Phi}{d\Omega}$$

wherein I is the radiation intensity in watts (W) per steradian (sr), $\Phi$ is the total radiation power in watts and $\Omega$ is the solid angle in steradians. If a direction distribution function of a light source is known, the radiation intensity can also be determined by multiplication by the total radiation power. In the case of light, the term "light intensity" is also used instead of radiation intensity. The term is used in this sense in the context of the present application. The light intensity describes the unweighted distribution of the radiation power or light power over the space. The SI unit "luminous intensity" likewise describes this, but in a manner weighted with the brightness perception of a standard observer. Since optical sensors and illumination arrangements which work e.g. in an infrared wavelength range are also conceivable, in principle, in the present case, photometric units that take account of the brightness perception of the human eye are unsuitable, however. In the context of the present application, therefore, the emission characteristic of the illumination arrangements is described by the distribution of the light intensity in order actually to give a pure energetic comparison.

In the present case, the "emission angle" is understood to mean the angle between the directions in which an illumination arrangement emits 50% of its maximum light intensity.

An SI unit related to the radiation intensity is the irradiance, which is specified by $$E = \frac{d\Phi}{dA}$$

wherein E is the irradiance in watts (W) per square meter (m$^2$), $\Phi$ is the total radiation power in watts and A is the area in square meters. The irradiance can be measured by means of a radiometer, for example. Both variables can be converted into one another by means of the equation $$E = \frac{I}{r^2}$$

wherein r is a distance from the radiation source. An emission characteristic of a radiation source can be measured in this way.

In the present case, the "emission angle" is the angle between the directions in which an illumination arrangement emits 50% of its maximum light intensity.

In the context of the present application, a "ring" should be understood to mean an arbitrary closed cross section. Consequently, the term "ring" does not necessarily mean that the cross section is rotated about an axis, thereby resulting in a circular ring. A "ring" is understood to mean the extrusion of a cross section along an arbitrary closed line. By way of example, the "ring" can thus also have a quadrilateral outer shape such as arises, for example, if an arbitrary cross section, for example a circle or a rectangle, is extruded along a closed square line.

The term "free" should be understood to mean that an illumination module can have a central cutout. The light which is ultimately intended to be imaged onto the optical sensor can pass through this central cutout without beam deflection. The at least one illumination arrangement and the first interface device for the sensor-side coupling of the illumination module can then be arranged in the edge region.

In this case, "sensor-side" is understood to mean that side of the illumination module which faces in the direction of the optical sensor. It is situated opposite a "workpiece-side" side of the illumination module facing in the direction of the workpiece. The light for illuminating the workpiece is furthermore emitted from the workpiece-side side of the illumination module.

The illumination module proposed in accordance with the first aspect makes it possible to illuminate a plurality of working regions or working planes simultaneously by means of the at least one illumination arrangement. Hitherto it was always necessary to provide a plurality of illumination arrangements or groups of illumination arrangements for different working regions or working planes, which were then switched optionally. In other embodiments, the illumination arrangements had to be moved relative to the sensor in order to set different working distances. By means of the present invention, however, there is no further need for this. It has been established that the light intensity of many illumination arrangements is high enough that even below the maximum light intensity it can still provide a sufficient illumination of workpieces. In particular, this is the case for modern LEDs for example. In general, all locations within an emission angle, i.e. all locations with a light intensity of more than 50%, are illuminated sufficiently to detect a usable image by means of modern optical sensors. In particular, this is the case if, as proposed according to the invention, within the emission angle the light intensity profile is set in an asymmetrical fashion. In this way, it is possible to form "centroids" with regard to the light intensity, to be precise in such a way that specific working regions or working planes are irradiated. In this way, it then becomes possible to irradiate a plurality of working regions or working planes simultaneously to a sufficient extent, such that it is possible to work in a plurality of working planes without having to exchange or switch over the illumination. In this way, illumination arrangements can be saved and the structural construction of illumination modules can be simplified.

In accordance with a third aspect, it is proposed to provide a coordinate measuring machine for measuring a workpiece by means of an optical sensor, wherein the coordinate measuring machine comprises at least one illumination module, in particular a plurality of illumination modules, in accordance with the first aspect of the invention or one of tis refinements, and wherein a measurement cone, in particular a measurement cylinder, of the optical sensor runs along the axis of rotational symmetry. For example, there may be provided a coordinate measuring machine for measuring a workpiece by means of an optical sensor, comprising an illumination module for a coordinate measuring machine for measuring a workpiece by means of an optical sensor, wherein the illumination module comprises a main body having a sensor side and a workpiece side, wherein the illumination module comprises on the main body at least one illumination arrangement for illuminating the workpiece, and wherein the at least one illumination arrangement has an emission characteristic with an emission angle and a light intensity profile within the emission angle, wherein the light intensity profile of the at least one illumination arrangement within the emission angle is asymmetrical, and wherein a measurement cone of the optical sensor runs along the axis of rotational symmetry. Furthermore, provision can be made of a holding device having at least one magazine location, in particular a plurality of magazine locations, for the illumination module or the illumination modules.

In accordance with a fourth aspect, it is proposed to provide a coordinate measuring machine for measuring a workpiece by means of an optical sensor, comprising an illumination module for a coordinate measuring machine for measuring a workpiece by means of an optical sensor, wherein the illumination module comprises a main body having a sensor side and a workpiece side, wherein the illumination module comprises on the main body at least one illumination arrangement for illuminating the workpiece, and wherein the at least one illumination arrangement has an emission characteristic with an emission angle and a light intensity profile within the emission angle, wherein the light intensity profile of the at least one illumination arrangement within the emission angle is asymmetrical, wherein in that the emission characteristic of each illumination arrangement is modulated in such a way that it has a first partial region and a second partial region, wherein there is a shadow region between the first partial region and the second partial region, and wherein the first partial regions of the at least one illumination arrangement coincide in a first working region and second partial regions of the at least one illumination arrangement coincide with a second working region, and in that the at least one illumination arrangement has in each case at least one optical element which modulates the emission characteristic of the respective illumination arrangement, and wherein a measurement cone of the optical sensor runs along the axis of rotational symmetry.

The coordinate measuring machine in accordance with the second aspect of the invention therefore has the same advantages as the illumination module in accordance with the first aspect of the invention.

In one refinement of the illumination module, it is provided that the light intensity profile of the at least one illumination arrangement is asymmetrical with respect to a direction of a maximum light intensity of the illumination arrangement.

In this way, it becomes particularly simple to form two partial regions within the light cone, within each of which a desired light intensity profile is provided. The light cone can then be suitably split approximately in the direction of the maximum light intensity, for example—as will also be explained below—by means of a prism, such that by means of a light cone with the different light intensity profiles thus set can then be used for illuminating two working regions or working planes.

In a further refinement of the illumination module, it can be provided that the at least one illumination arrangement has in each case at least one optical element which modulates the emission characteristic of the respective illumination arrangements.

This makes it possible to use normal conventional illumination arrangements. In this regard, conventional light sources and customary passive elements, such as light guides and the like, for example, can be used. Special light sources which already have an asymmetrical emission characteristic are possible, of course, but emitters such as LEDs, for example, which have a directional emission characteristic that is substantially symmetrical, are more cost-effective. This is achieved by the modulation by means of at least one optical element.

In a further refinement of the illumination module, it can be provided in this case that the at least one illumination arrangement has at least one light guide, and wherein the at least one optical element is arranged at a workpiece-side end of the light guide.

In this way, the illumination module can be embodied for example as a passive illumination module which guides the light to the workpiece in a suitable manner through at least one light guide. At the workpiece-side end, the light emerging from the light guide is then modulated as desired.

In a further refinement of the illumination module, it can be provided that the at least one illumination arrangement has a light source, and wherein the at least one optical element modulates an emission characteristic of the light source.

The illumination arrangement can thus also be configured as an active illumination arrangement with a dedicated light source, which is arranged in particular at a workpiece side of the illumination module. The light source per se can be embodied in a conventional manner, for example can be a directional light source which emits in the manner of a Lambertian emitter. A suitable optical element that covers the light source, for example, can then modulate the emission characteristic of the entire illumination arrangement as desired.

In one refinement of the illumination module, it can be provided that the at least one light source is an LED or light-emitting diode or an OLED or organic light-emitting diode. Furthermore, the light source can also be a laser (Light Amplification through Stimulated Emission of Radiation) element. The emitted light can be light in a visible spectral range of approximately 380 to 780 nm. However, it can indeed also be light in a non-visible spectral range, for example in the ultraviolet range or in the infrared range.

In a further refinement of the illumination module, it can be provided that the at least one optical element is at least one refractive optical element and/or at least one diffractive optical element and/or at least one holographic optical element and/or at least one reflective optical element.

According to the invention, the at least one optical element can thus bring about an optical effect in various ways. In particular, it can be provided that a refractive optical element is provided for influencing the emission characteristic.

In a further refinement of the illumination module, it can be provided that the at least one optical element has a prism arranged in a partial region of the emission angle.

In this way, in a structurally relatively simple manner, part of the light emitted by the illumination arrangement can be "branched off" and guided into a different spatial region. In this way, the emission cone of the illumination arrangement is as it were split in two.

In a further refinement of the illumination, it can be provided that the at least one optical element has a meniscus lens element arranged in the entire emission angle.

By way of example, it can be provided in this case that one of the surfaces of the meniscus lens element is configured in an aspherical fashion in order in this way to produce the suitable asymmetry in the emission characteristic of the illumination arrangement. Some other asymmetrical embodiment of the meniscus lens element is also conceivable, for example a tilting of the front and back surfaces of the meniscus lens element relative to one another only in a partial region of the surface, in order to bring about a prismatic effect only there. In this way, too, the desired emission characteristic of the illumination arrangement can be set using simple means.

In a further refinement of the illumination module, it can be provided that the sensor side has a first interface device for the sensor-side coupling of the illumination module in a defined position.

In this way, a predefined arrangement of the illumination module relative to the optical sensor of the coordinate measuring machine is made possible, such that the set emission characteristic with respect to said optical sensor detects and illuminates desired working planes. By way of example, it can be provided that a three-point mounting is effected. This involves providing, for example, a mounting by means of ball pairs, ball-roller pairs or a mounting in a depression for the first ball, a mounting in a V-groove for the second ball and a mounting on a surface for the third ball.

In a further refinement of the illumination module, it can be provided that the main body has the form of a ring having a free central region and an edge region, wherein the at least one illumination arrangement is arranged in the edge region on the workpiece side.

A particularly simple construction of the illumination module is achieved in this way. Through the free central region, the workpiece can be observed in an unimpeded manner by the optical sensor.

In a further refinement of the illumination module, it can be provided that the illumination module comprises a plurality of illumination arrangements arranged on the workpiece side of the main body rotationally symmetrically with respect to an axis of rotational symmetry, wherein each illumination arrangement has a direction of maximum light intensity, and wherein the illumination arrangements are aligned in such a way that the directions of maximum light intensity intersect at a first point lying on the axis of rotational symmetry.

A particularly uniform illumination of a workpiece from all sides can be ensured in this way.

In a further refinement of the illumination module, it can be provided that the emission characteristic of each illumination arrangement is modulated in such a way that it has a first partial region and at least one second partial region. In this case, the first partial regions can coincide in a first working region. The working regions of the second illumination regions can coincide in a second working region. Furthermore, third or fourth partial regions can also be present, which coincide in a third or fourth working region, respectively. Even further partial regions are conceivable over and above that as well.

In a further refinement of the illumination module, it can be provided that the emission characteristic of each illumination arrangement is modulated in such a way that it has a first partial region and a second partial region, wherein there is a shadow region between the first partial region and the second partial region, and wherein the first partial regions of the illumination arrangements coincide in a first working region and second partial regions of the illumination arrangements coincide in a second working region.

In this way, it is possible to illuminate two discrete working regions. Possibly disturbing reflections from an intervening region of the workpiece are minimized or avoided in this way.

In a further refinement of the illumination module, it can be provided that the emission characteristic of each illumination arrangement is modulated in such a way that it has a first partial region and a second partial region, wherein the first partial region and the second partial region touch at the first point, wherein the first partial regions of the illumination arrangements coincide in a first working region and the second partial regions of the illumination arrangements coincide in a second working region, and wherein the emission characteristic of each illumination arrangement is furthermore modulated in such a way that a direction of a maximum light intensity of the illumination arrangement does not halve the emission angle.

In this way, it is possible likewise to illuminate two working regions. It is then usually the case that the working regions are at different distances from the illumination arrangement. Therefore, it is advantageous to set the direction of the maximum light intensity in such a way that it does not halve the emission angle. If the emission angle is 50°, for example, in that case the direction of the maximum light intensity will not lie exactly in the center, such that toward the limits of the emission angle on all sides there is an angle of 25° between the direction of the maximum light intensity and the limit of the emission angle. Such an alignment of the direction of the maximum light intensity makes it possible to take account of the different distances between the working regions and the illumination arrangement and to ensure that substantially identical powers act on identical areas at different distances, i.e. the irradiance remains substantially constant.

In a further refinement of the illumination module, it can be provided that the illumination module comprises an identification device for identifying at least one type of the illumination module.

Both an active and a passive illumination module can be involved in this case. In this way, it becomes possible for a coordinate measuring machine or a regulating device of the coordinate measuring machine to know which illumination module(s) is (are) coupled to the optical sensor. In this way, it is possible to check whether the desired or correct illumination module has been coupled. In the case of a manual change as well, in this way it is possible directly to establish which illumination module was coupled. In this case, the identification device can communicate at least one type of the illumination module. Over and above that, however, it can also provide further data of the illumination module, such as, for example, status of the energy supply, functionality of one or more illumination arrangements, etc. The identification device can be provided as an active identification device, which requires a dedicated energy supply, or else as a passive identification device, which does not require a dedicated energy supply. By way of example, the identification device can be embodied as a permanent memory from which the required data of the illumination module can be read out. The identification device can be embedded in a wire-based fashion or alternatively in a wireless fashion. By way of example, the identification device can also be an RFID chip.

It goes without saying that the features mentioned above and those yet to be explained below can be used not only in the combination respectively indicated, but also in other combinations or by themselves, without departing from the scope of the present invention.

BRIEF DESCRIPTION OF THE SEVERAL VIEWS OF THE DRAWING

Embodiments of the invention are illustrated in the drawings and are explained in greater detail in the description below. In the figures.

DETAILED DESCRIPTION OF THE INVENTION

Figure 1:
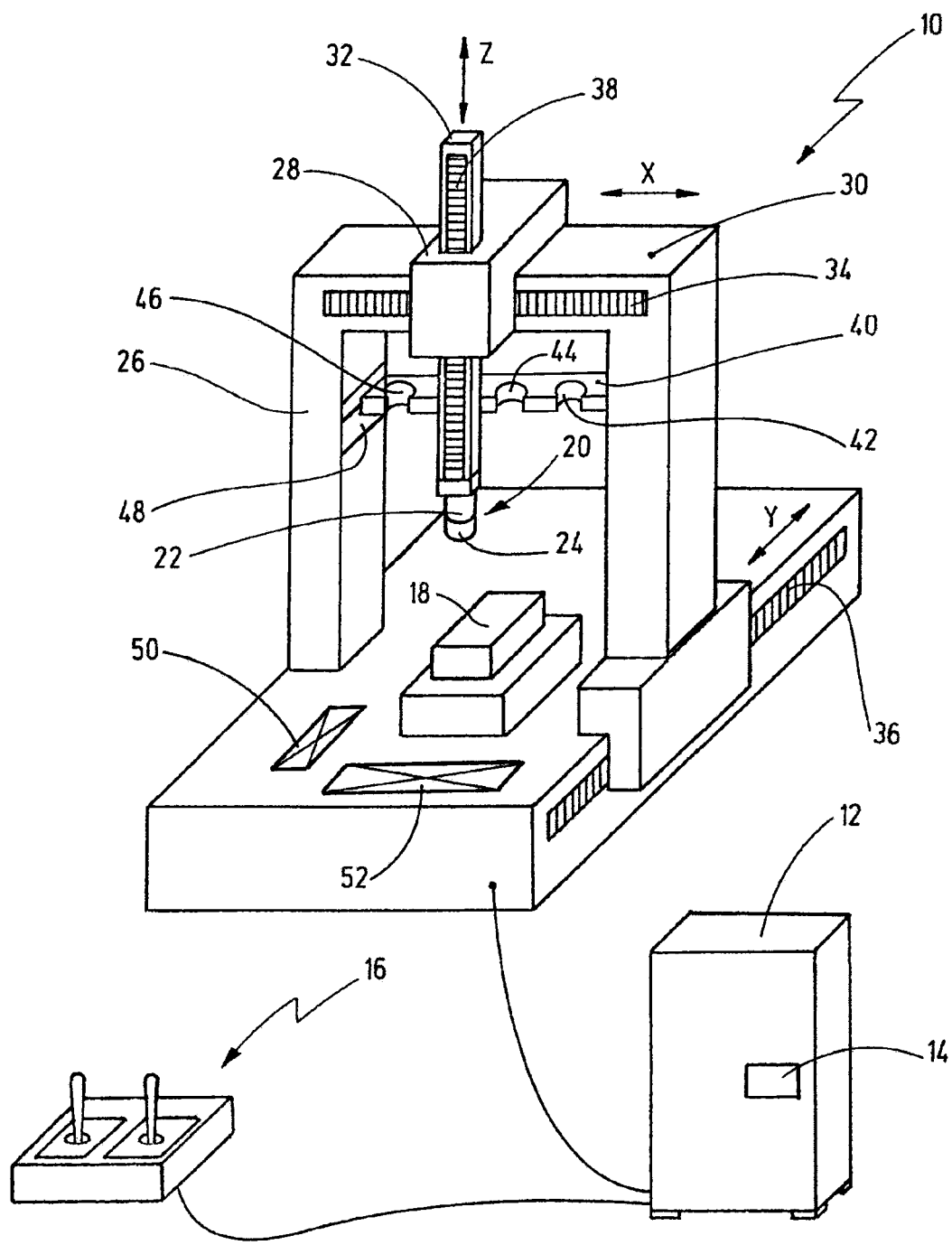
FIG. 1 shows one embodiment of a coordinate measuring machine according to the invention.

FIG. 1 shows one embodiment of a coordinate measuring machine 10. The coordinate measuring machine 10 comprises a regulating device 12 designed to control the coordinate measuring machine 10 in an automated manner. For this purpose, the regulating device 12 can have a data processing unit 14. Furthermore, the regulating device 12 can also have display devices that display information about selected operating modes, measurement results, etc. to a user of the coordinate measuring machine 10. Furthermore, the coordinate measuring machine 10 comprises an operation device 16, which enables a user to control the coordinate measuring machine 10. The operation device 16 is merely illustrated schematically here. This is intended firstly to enable the coordinate measuring machine 10 to be moved manually. Furthermore, the operation device 16 can be designed to enable the user to input the system inputs into the regulating device 12 in order to select an operating mode, etc. The regulating device 12 can furthermore also automatically regulate the coordinate measuring machine 10.

The coordinate measuring machine 10 serves to measure a workpiece 18. For this purpose, the coordinate measuring machine 10 comprises an optical sensor head 20 having an optical sensor 22 and an illumination module 24. The illumination module 24 is coupled to the optical sensor 22.

In order to be able to move the optical sensor head 20 relative to the workpiece 18, the coordinate measuring machine in the embodiment illustrated comprises a gantry 26, which is movable in a Y-direction. A slide 28 is mounted movably in an X-direction on a crossbar 30 of the gantry 26. In this way, the optical sensor head 20 can be moved in the X-direction by the movement of the slide 28 on the crossbar 30. A quill 32 is provided in the slide 28, said quill being movable relative to the slide 28 in a Z-direction. The optical sensor head 20 is then fitted to the quill 32. In this way, it is possible to move the optical sensor head 20 in all three spatial directions X, Y and Z. A mounting of the gantry 26 of the slide 28 and of the quill 32 with respect to one another can be implemented by means of so-called air bearings, for example. In order to detect a position of the gantry 26, of the slide 28 and of the quill 32, the coordinate measuring machine 10 can have scales. By way of example, a scale 34 for the X-direction, a scale 36 for the Y-direction and a scale 38 for the Z-direction can be provided.

Furthermore, the coordinate measuring machine 10 can comprise a holding device 40. In the holding device 40, at least one magazine location is provided, in particular a plurality of magazine locations are provided. A first magazine location 42, a second magazine location 44 and a third magazine location 46 are illustrated. Each of the magazine locations 42, 44, 46 can be provided for carrying a specific illumination module 24. An illumination module 24 can then be changed in an automated manner for example in such a way that the regulating device 12 places a currently coupled illumination module 24 in one of the magazine locations 42, 44, 46 and takes up a further illumination module (not illustrated) from another of the magazine locations 42, 44, 46.

In the embodiment illustrated, the holding device 40 is fitted to the gantry 26, such that the holding device 40 extends below the crossbar 30 parallel to the crossbar 30 in the X-direction. Alternatively, provision can also be made, for example, for fitting the holding device 40 directly to the crossbar 30. By means of a corresponding arrangement of the holding device 40, travels for changing an illumination module 24 can be kept particularly short. As is evident from the illustrated view, however, in the illustrated arrangement there is initially no possibility at all for moving the optical sensor 22 and the holding device 40 relative to one another in the Y-direction. Therefore, the holding device 40 is mounted on a slide 48 in the gantry 26 in the embodiment illustrated, such that relative movement of the holding device 40 with respect to the optical sensor 22 in the Y-direction becomes possible. In this case, the holding device 40 is moved in the Y-direction relative to the gantry 26 of the slide 48.

It goes without saying that alternative arrangements of the holding device 40 are furthermore conceivable. By way of example, it is possible for the holding device 40 to be positioned at schematically indicated installation locations 50, 52. It is then situated freely in the coordinate measuring machine 10. The optical sensor 22 can then move freely to the magazine locations 42, 44, 46 in order to place or take up an illumination module 24.

Figure 2:
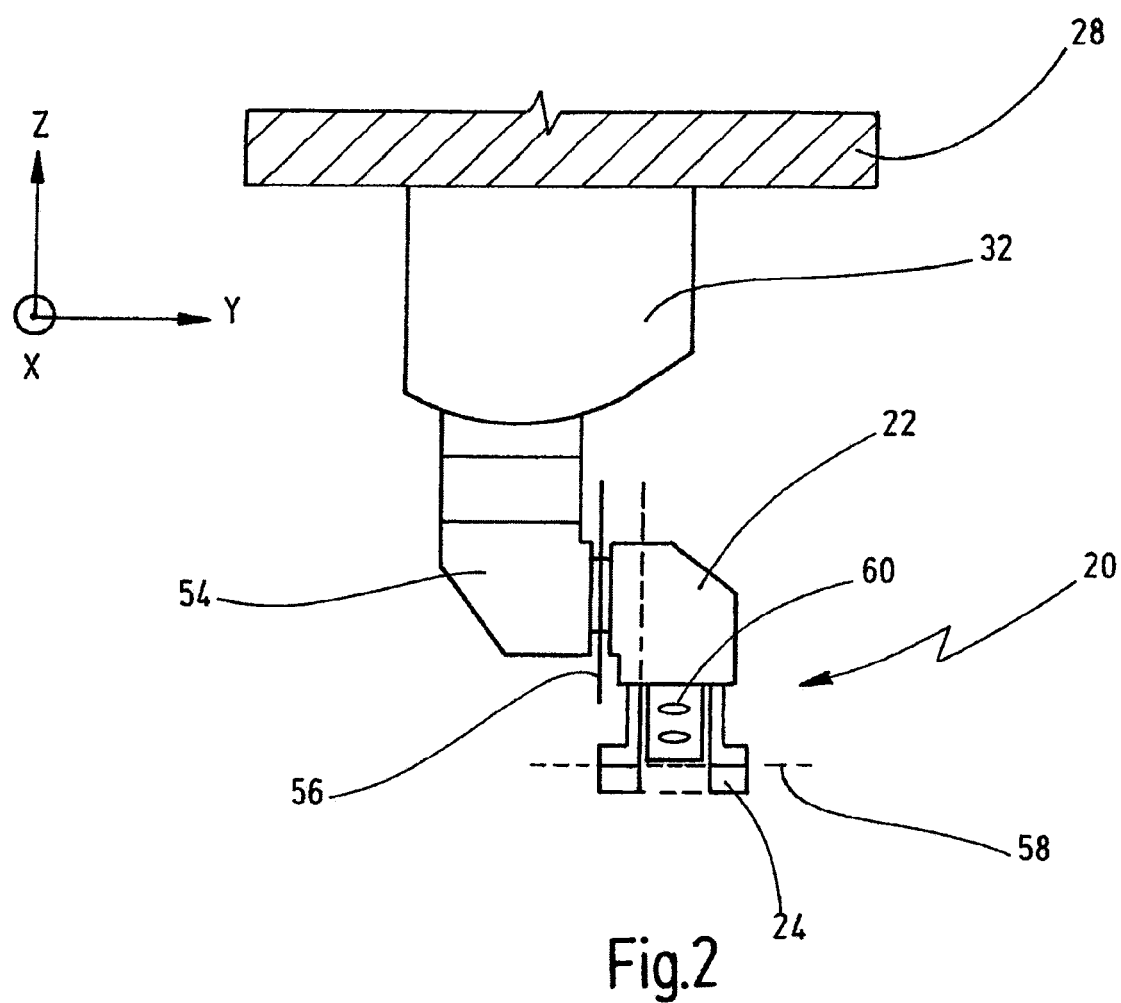
FIG. 2 shows a detail view of an optical sensor of a coordinate measuring machine, said optical sensor being equipped with an illumination module.

FIG. 2 shows a schematic detail view of part of the coordinate measuring machine 10. The slide 28 and the quill 32 are once again illustrated schematically. As can be gathered from FIG. 2, by way of example, a so-called rotary pivoting unit 54 can be arranged on the quill 32, said unit enabling the optical sensor 22 to rotate about two axes, in particular both about the Z-direction and about the Y-direction, for example, in the embodiment illustrated. In this way, the optical sensor 22 can be aligned in a multiplicity of directions in order to view the workpiece 18 from a desired viewing angle. In this case, various system components are coupled via change surfaces 56; by way of example, the optical sensor 22 is coupled to the rotary pivoting unit 54 by means of a change surface 56. Electrical supply lines, communication interfaces, optical interfaces, etc. are provided via the change surface 56 in order firstly to supply the optical sensor 22 with energy and secondly to be able to irradiate the workpiece 18. Furthermore, the data detected by the optical sensor 22 are conducted via the change surface 56 and the interfaces provided there to the regulating device 12 and the data processing unit 14 thereof.

The illumination module 24 is coupled to the optical sensor 22 along a first interface device 58. In the embodiment illustrated, the illumination module 24 has the form of a circular ring. Furthermore, the optical sensor 22 also has an imaging optics 60, which serves to image light radiation received from a workpiece 18 onto the optical sensor 22.

The configuration of the illumination module 24 is explained below with regard to the further figures.

Figure 3:
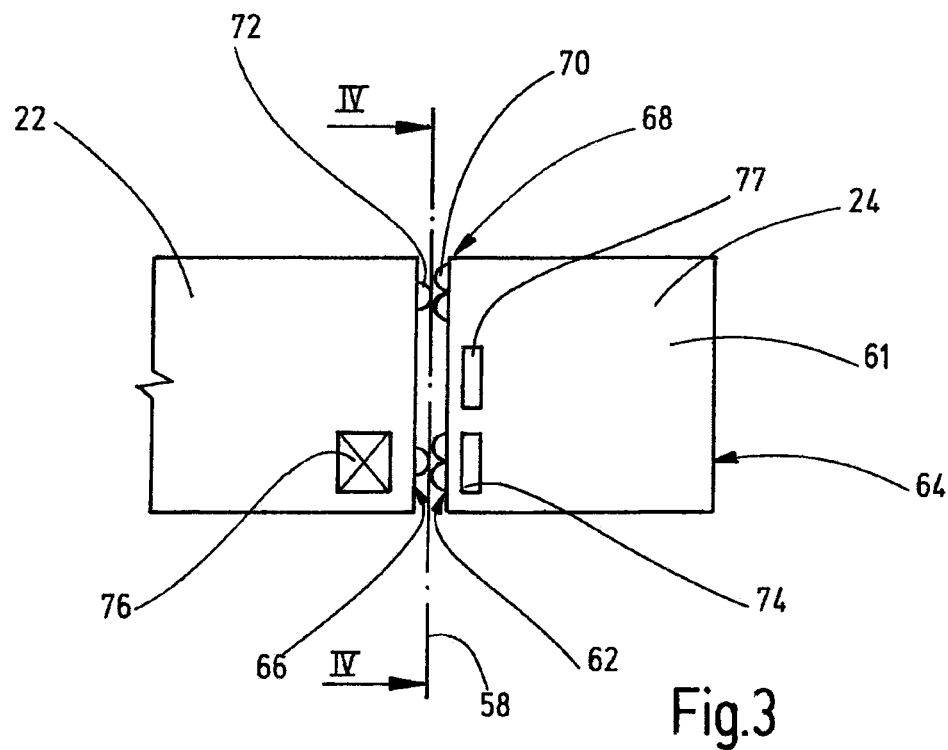
FIG. 3 shows a schematic view of an illumination module coupled to an optical sensor.

FIG. 3 schematically illustrates the illumination module 24 coupled to the optical sensor 22.

The illumination module 24 comprises a main body 61. The main body 61 in turn has a sensor side 62 facing the optical sensor 22. Situated opposite the sensor side 62, the main body 61 has a workpiece side 64, which faces the workpiece 18 during operation.

In the coupled state, the sensor side 62 of the main body 61 is situated opposite a coupling side 66 of the sensor 22.

A three-point mounting 68 is provided for coupling the coupling side 66 of the optical sensor 22 and the sensor side 62 of the main body 61. Such a three-point mounting is known in principle to a person of average skill in the art and serves to couple the illumination module 24 to the optical sensor 62 in an unambiguous position. For this purpose, provision is made of three-point bearing elements 68 on the sensor side 62 of the illumination module 24 and three-point bearing elements 72 on the coupling side 66 of the optical sensor 22. In this case, provision is made, for example, of a mounting by means of ball pairs, ball-roller pairs or a mounting in a depression for the first ball, a mounting in a V-groove for the second ball and a mounting on a surface for the third ball of the three-point mounting.

In order to apply a required holding force that holds the illumination module 24 and the optical sensor 22 together, provision can be made for a permanent magnet 74 to be provided in the main body 61. In this case, the permanent magnet 74 is arranged in such a way that the magnetic field lines extend via the first interface device 58 through the optical sensor 22, such that a suitable holding force is provided between the illumination module 24 and the optical sensor 22. Of course, the magnetic field lines in this case have to extend through a ferromagnetic material in the optical sensor 22. A further permanent magnet or an electromagnet (not illustrated) can also be present in the optical sensor in order, together with the permanent magnet 74, to apply the required holding force. It goes without saying that provision can furthermore also be made for providing additional permanent magnets both in the illumination module 24 and/or in the optical sensor 22. It goes without saying that provision can also be made for the permanent magnet 74 to be provided only in the optical sensor 22.

Furthermore, provision can be made for the optical sensor 22 to have an electromagnet 76 that is switchable. In this case, said electromagnet is configured in such a way that it at least partly neutralizes a magnetic field applied by the permanent magnet 74, such that the illumination module 24 can be separated from the optical sensor 22 more easily. It goes without saying that provision can also be made for one or a plurality of electromagnets to be arranged in the illumination module 24. In order to avoid the need for an energy supply of the illumination module 24, the electromagnet will generally be provided in the optical sensor 22.

Furthermore, however an energy receiving device 77 can also be provided in the illumination module 24, said energy receiving device being coupled to the optical sensor 22 either in a wireless fashion or in a wire-based fashion via the first interface device 58 in such a way that the illumination module 24 is provided with an energy supply.

Figure 4:
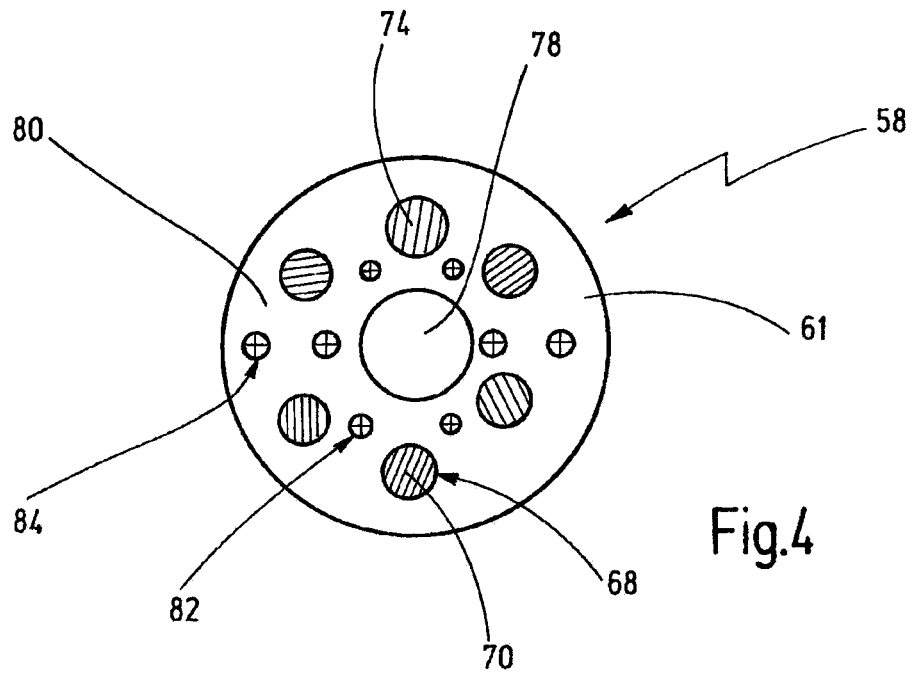
FIG. 4 shows a schematic cross-sectional view along a line IV-IV in FIG. 3, FIGS. 5a to 5c show different embodiments of an illumination module according to the invention.

FIG. 4 shows a cross-sectional view along a line IV-IV in FIG. 3.

As can be discerned in the cross section of FIG. 4, the main body 61 has the form of a circular ring. In other words, the main body 61 substantially has the form of a cylinder having a central cutout. In this respect, the main body 61 of the illumination module 24 has a free central region 78 forming the cutout. Furthermore, the main body 61 has an edge region 80. The edge region 80 then has the first interface device 58 having in the embodiment illustrated, for example, three permanent magnets 74, and further optical interfaces 82, in order to guide light from the optical sensor 22 into the illumination module 24, and electrical interfaces 84 for the energy supply of the illumination module 24. The three-point mounting is illustrated only schematically here in FIG. 4 and the following figures.

It goes without saying that the embodiment illustrated in FIG. 4 should be understood merely by way of example. For example, an illumination module 24 comprising only passive illumination arrangements can also comprise no electrical interfaces 84 whatsoever in the edge region 80. Furthermore, it is possible for an illumination module 24 comprising only active illumination arrangements to comprise no optical interfaces 82 whatsoever in the edge region 80.

FIG. 5a illustrates a first embodiment of an illumination module 24 by way of example. Identical elements are identified by identical reference signs and will not be explained again hereinafter.

In the embodiment illustrated, the optical sensor 22 has at least one light source 86. In the embodiment illustrated, the light source 86 is embodied for example in a ring-shaped fashion, i.e. it has a ring-shaped, light-emitting element. However, the light source 86 can for example also be embodied as a plurality of point light sources, for example LEDs or OLEDs or lasers, arranged in a ring-shaped fashion.

The illumination module 24 comprises an illumination arrangement 88. The illumination arrangement 88 is embodied only in a passive fashion. The illumination arrangement 88 therefore has a ring-shaped light guide 89 and can furthermore have refractive optical elements 90, diffractive optical elements 92, reflective optical elements 93 and/or holographic optical elements 94. This need not be the case, however. Arbitrary combinations of such optical elements are conceivable in order to provide a desired illumination by means of the illumination arrangement 88. Furthermore, instead of a ring-shaped light guide 89, a plurality of illumination arrangements arranged in a rotationally symmetrical fashion or in a circular fashion are also conceivable, of course; in this case, the illumination arrangements can be active or passive. The light emitted by the light source 86 is coupled into the light guide 89, guided through the illumination module 24 and deflected in a desired manner, such that a suitable illumination of the workpiece 18 by means of the illumination module 24 is ultimately provided. Furthermore, the illumination module 24 comprises a change interface device 96, which is embodied as a circumferential projection in the embodiment illustrated. The circumferential projection can then interact for example with a circumferential groove in a magazine location 42, 44, 46 of the holding device 40, such that, for example, the illumination module 24 can then be inserted into such a magazine location. One or a plurality of the optical elements 90, 92, 93, 94 can change an emission characteristic of the respective illumination arrangement 88 in such a way that the light intensity profile within an emission angle of the respective illumination arrangement is asymmetrical.

FIG. 5b illustrates a further embodiment of an illumination module 24. Identical elements are once again identified by identical reference signs. Therefore, only the differences will be discussed.

The illumination module 24 comprises an identification device 98, which can be read by an identification reader 100. In this case, the reading can be effected in a wire-based manner or else in a wireless manner. The identification reader 100 can be arranged in the optical sensor 22. However, it can also be arranged in any other element of the coordinate measuring machine 10. It can also directly be part of the regulating device 12 or of the data processing unit 14. In this way, it is possible ambiguously to identify the illumination module 24 and to provide this information to the regulating device 12. This firstly serves to identify the coupled illumination module 24 and the illumination type thereof; secondly, by way of example, dimensions of the illumination module 24 can also be stored in the identification device 98 and read out in order in this way to enable a collision-free regulation of a movement of the optical sensor 22 coupled to the illumination module 24.

In the embodiment illustrated, the illumination module 24 is configured as a so-called active illumination module. It comprises two light sources 102. Each light source 102 forms an illumination arrangement, such that the illumination module 24 in FIG. 5b comprises two illumination arrangements 88, 104. In this case, each of the illumination arrangements has an optical element 105, which changes an emission characteristic of the respective light source 102 in such a way that the light intensity profile within an emission angle of the respective light source 102 is asymmetrical.

In particular, the light source 102 can be embodied using energy-saving LED/OLED technology or as a laser. The light sources 102 can be used for example in groups, separated according to colors, in continuous wave operation or in pulsed operation. If many different light sources are intended to be used, then it is advantageous to provide a control device directly in the illumination module 24. Correspondingly, an electrical interface for supplying such a control device with energy and control signals is to be provided via the first interface device 58. In this case, the supply with electrical energy can be embodied in a wireless fashion or in a wire-based fashion. In particular, it can furthermore be provided that an energy supply for a control device and an energy supply for the light source 102 are embodied separately from one another.

FIG. 5c illustrates yet another embodiment of an illumination module 24. The illumination module 24 in FIG. 5c comprises in combination both active and passive illumination arrangements 88, 104 and 106. In the example illustrated, for instance, the illumination arrangement 88 is a circular ring light which, merely by means of two light guides 89, 103 and reflective optical elements 93, guides light emitted by a light source 86 of the optical sensor 22 through the illumination module 24 and reflects it onto the workpiece 18 as desired. Furthermore, two illumination arrangements 104 and 106, each provided as light sources 102 that emit light actively, are provided in a supporting manner.

Consequently, the illumination module 24 according to the invention can comprise either passive illumination arrangements 88, 104, 106, active illumination arrangements 88, 104, 106 or both active and passive illumination arrangements 88, 104, 106. In the case of at least one of the illumination arrangements 88, 104, 106, an emission characteristic of the respective illumination arrangements 88, 104, 106 is changed by means of the optical elements 90, 92, 93, 94, 105 in such a way that the light intensity profile within an emission angle of the respective illumination arrangements 88, 104, 106 is asymmetrical.

Figure 6:
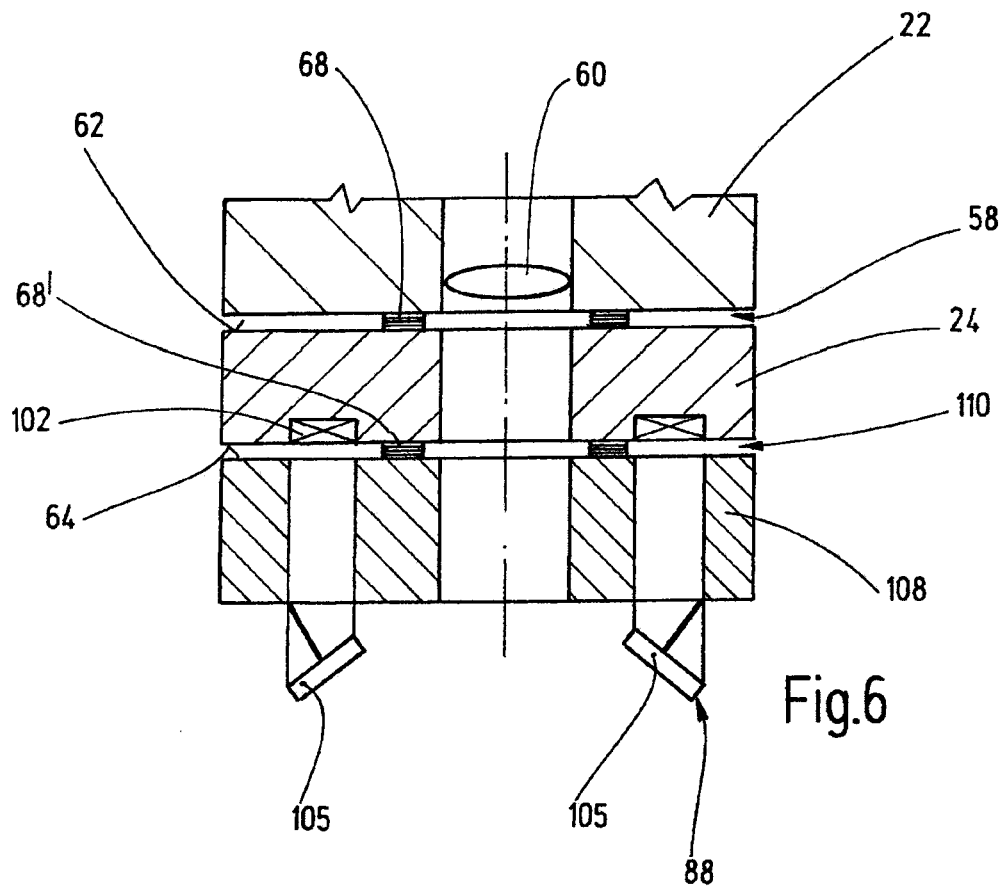
FIG. 6 shows one embodiment of a cascade coupling of a plurality of illumination modules according to the invention.

FIG. 6 illustrates yet another embodiment of an illumination module 24. The illumination module 24 illustrated therein comprises on the sensor side 62 a first interface arrangement 58, which couples the illumination module 24 to the optical sensor 22. Furthermore, the illumination module 24 comprises on its workpiece side 64 a second interface arrangement 110, which serves for coupling a second illumination module 108 to the illumination module 24. In this case, the second interface device 110 can be embodied like the first interface device 58 in order to enable the fullest possible compatibility of the illumination modules 24, 108 with regard to their coupling to one another and to the optical sensor 22. This need not necessarily be the case, however. Provision can also be made for the second interface device 110 to have a different configuration than the interface device 58.

By means of this cascade-like coupling of a plurality of illumination modules 24, 108, in particular the number of illumination modules 24, 108 provided in total in a coordinate measuring machine 10 can be minimized. In particular, it can be provided, for example, that a coupling of two illumination modules 24, 108 provides a type of illumination for which a separate illumination module would otherwise have to have been provided. A particularly high flexibility in the use of the illumination modules 24, 108 is thus provided.

Figure 7:
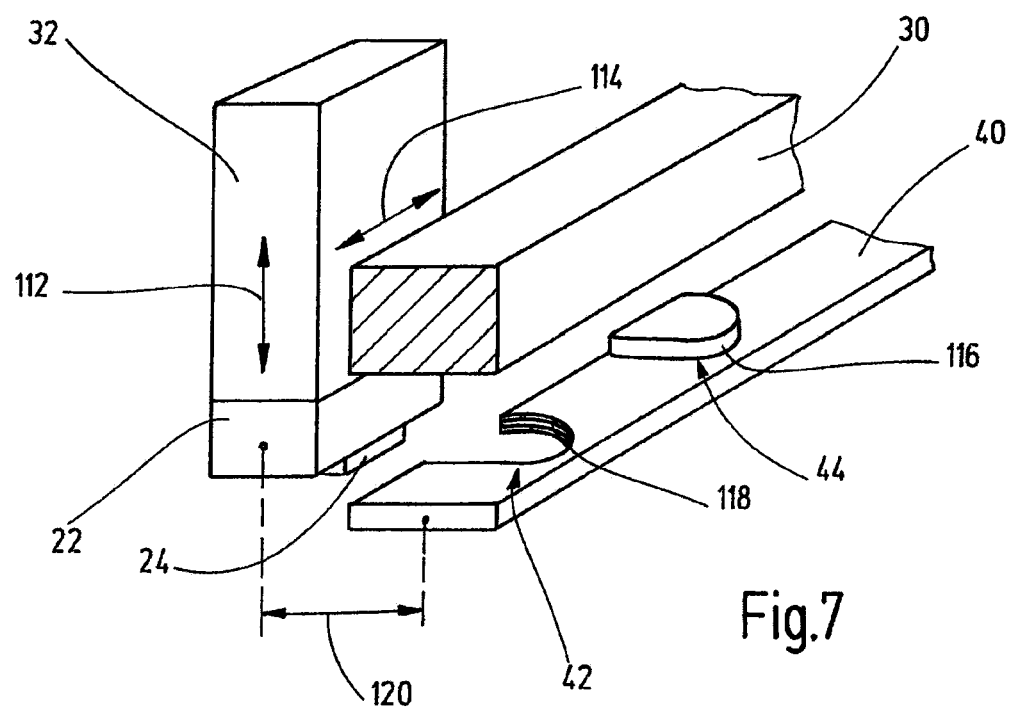
FIG. 7 shows a schematic detail view in the region of a holding device in a coordinate measuring machine.

FIG. 7 schematically illustrates an excerpt from the coordinate measuring machine 10 which exhibits travel movements for changing the illumination modules 24. In this case, the elements are merely indicated schematically and identified by the same reference signs as in the other figures.

In the embodiment illustrated, the quill 32 is attached to the crossbar 30 in an articulated manner and is movable relative thereto in the Z-direction 112 and in the X-direction 114.

The illustration furthermore shows schematically that at a first magazine location 42 the holding device 40 has a circumferential groove 118, into which, for example, a change interface device 96, as illustrated in FIG. 5*a*, can engage. A further illumination module 116 is arranged in the second magazine location 44. By means of movement of the quill 32 relative to the crossbar 30 in the direction 112, 114, an illumination module 24 already coupled to the optical sensor 22 can be brought to a position in which only a traverse movement 120 of the quill 32 and the holding device 40 relative to one another still has to be effected in order to introduce the illumination module 24 into the magazine location 42, for example. The relative movement can either be performed by the holding device 40 being moved relative to the quill 32 by means of the slide 48, for example. However, if the holding device 40 is provided at an installation location 50, 52, for example, this can also be effected by means of a corresponding movement of the optical sensor 22 while the holding device 40 is stationary.

The illumination module 24 is then situated in the magazine location 42, the change interface device 96 intermeshing with the groove 118. By moving the quill 32 in the Z-direction 112, it is then possible to apply a suitable high force, such that the holding force from the permanent magnets 74 is overcome and the illumination module 24 thus "tears away" from the optical sensor 22. In this case, it can furthermore also be provided that a switchable electromagnet 76 provided by way of example is switched, which at least partly neutralizes a holding force of the permanent magnet 74.

Figure 8:
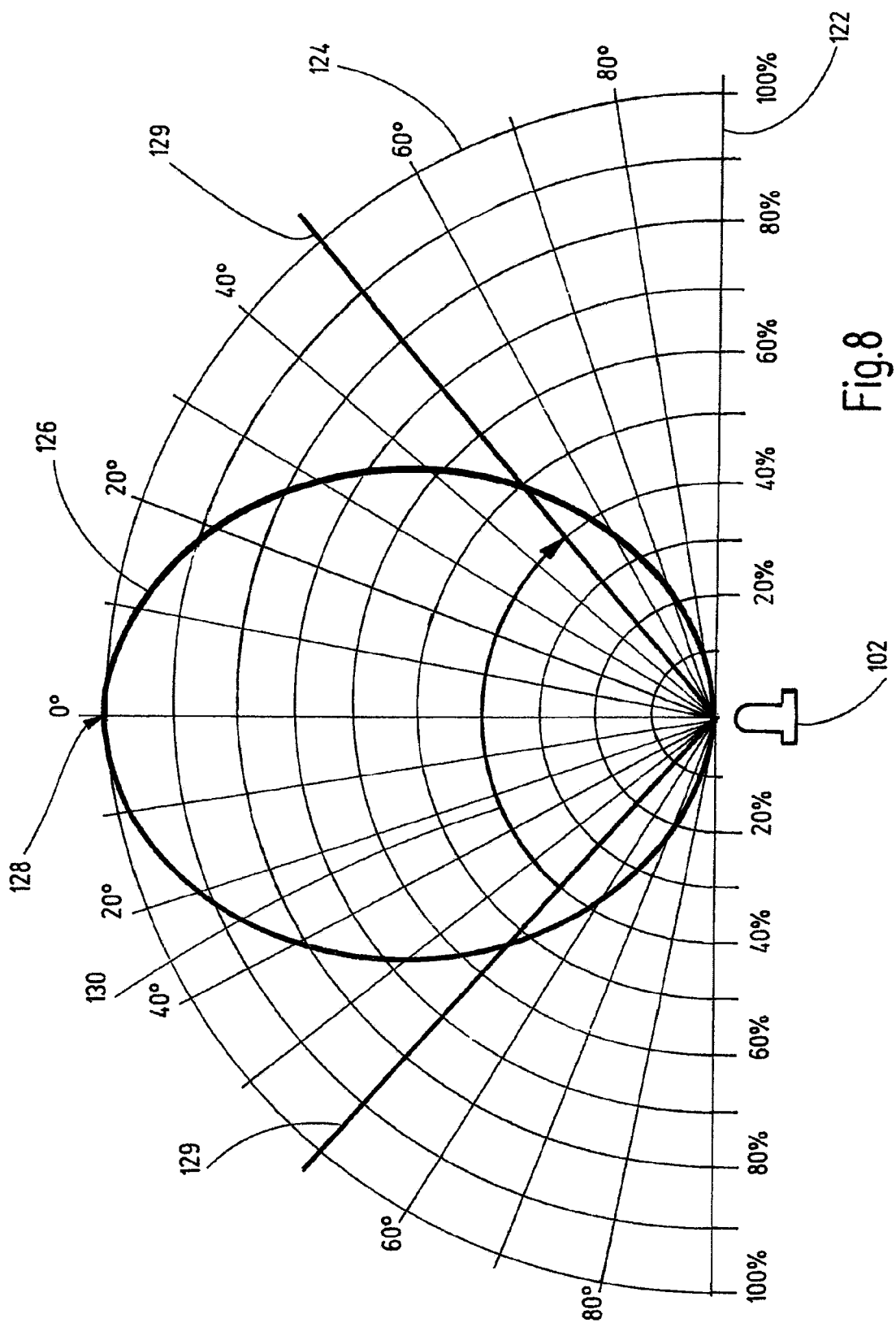
FIG. 8 shows a schematic illustration of an emission characteristic of an illumination arrangement.

FIG. 8 shows a schematic illustration showing a customary emission characteristic of a light source 102. The emission characteristic illustrated in FIG. 8 is embodied in a symmetrical manner in the illustration. In other words, it has not yet been modulated to the extent that it is asymmetrical. However, the symmetrical illustration is indeed suitable for illustration purposes.

The distribution of a light intensity 122 over an angle profile 124 of 180° in total is plotted. The light source 102 is a directional light source, for example an LED. Precisely toward the front, i.e. at an angle of 0°, the light source has the direction of the maximum light intensity 128. The further distribution of the light intensity over the angles is illustrated with a line 126. It decreases progressively and is ultimately 0 at an angle of ±90°. This results in the illustrated characteristic oval profile for the distribution of the light intensity. The term emission angle, then, denotes that angle which lies between the lines which describe the spatial directions in which a light intensity of 50% is still present. Said lines are designated by the reference sign 129. They lie at ±50° in the example illustrated. An emission angle 130 would thus be 100° in this case. The profile of the light intensity within this emission angle is now modulated according to the invention precisely such that, unlike in the example illustrated, it is not symmetrical, but rather proceeds asymmetrically within this emission angle. In particular, it is embodied asymmetrically with respect to the direction of the maximum light intensity 128. Examples of this are explained below.

Figure 9:
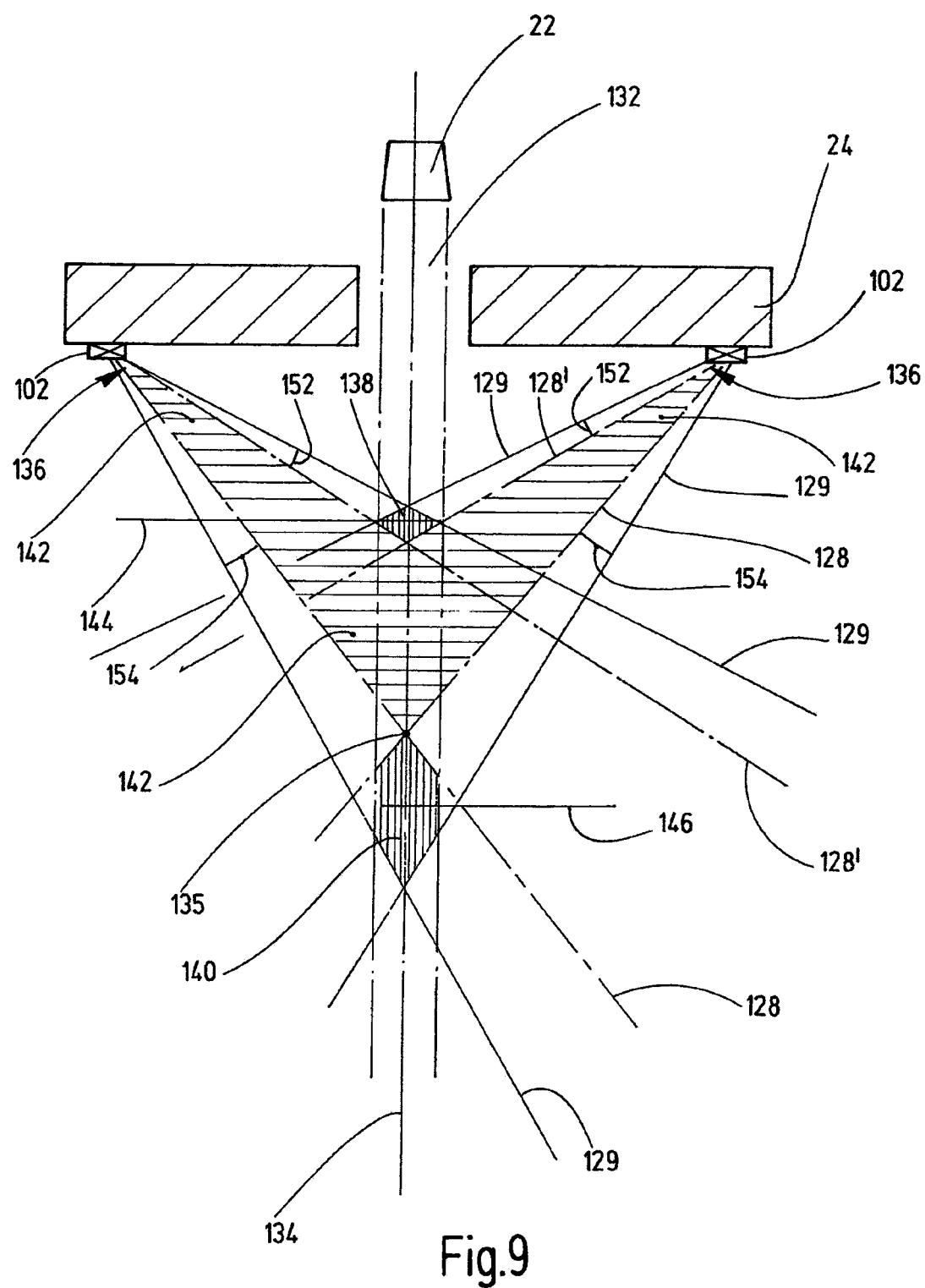
FIG. 9 shows a schematic view of one embodiment of an illumination module with the emission characteristics of the illumination arrangements.

FIG. 9 shows a schematic illustration of an illumination module 24 comprising, by way of example, two active light sources 102 in the form of LEDs. The illumination module 24 is provided for fitting in a coordinate measuring machine 10. A corresponding optical sensor 22 of the coordinate measuring machine 10 has a measurement cone, in particular a measurement cylinder, 132. In this case, the measurement cone or measurement cylinder 132 is understood to mean the spatial region with which the optical sensor 22 is aligned. The light sources 102 of the illumination arrangements are arranged rotationally symmetrically with respect to an axis 134 of rotational symmetry. The optical sensor 22 is aligned coaxially with respect to said axis 134 of rotational symmetry.

The emission characteristic of each illumination arrangement 102 is modulated in each case by means of a prism 136. In principle, the light sources 102 are aligned in such a way that the spatial directions in which a maximum light intensity 128 is present intersect at a first point 135. Said first point 135 lies approximately on the axis 134 of rotational symmetry. What can be achieved by means of the prism is that a part of the light intensity cone illustrated schematically in FIG. 8 is as it were folded away by a certain angular degree. By way of example, provision can be made for attempting to bring about a splitting of the emission characteristic approximately in the region of the maximum light intensity. Of course, it is not possible to divide as it were the direction of the maximum light intensity. Therefore, there will always be exactly one spatial direction in which the maximum light intensity is present, and this is designated by the reference sign 128. The Fig. furthermore just schematically illustrates a spatial direction in which almost this maximum light intensity is attained within the other region not folded away, this being identified by the reference sign 128'. The emission characteristic within the emission angle is therefore asymmetrical with respect to the spatial direction with the maximum light intensity 128.

Consequently, a first partial region 152 and a second partial region 154 are produced in a targeted manner. Between these partial regions 152, 154, each illumination arrangement 88 then has a shadow region 142. In this region, it emits no light or significantly less light. The illumination pattern illustrated in FIG. 9 then arises by virtue of the rotationally symmetrical arrangement of the light sources 102. All of the first partial regions 152 intersect in a first working region 138. All of the second partial regions intersect in a second working region 140. The light intensities of all the illumination arrangements or light sources 102 coincide in said first working region 138 and second working region 140. Between the working regions 138, 140 there is a shadow region 142 which is not illuminated, or is not illuminated homogeneously. A first working distance 144 and a second working region 146, which is further away for the optical sensor 22, are illuminated in this way. The first working distance 144 and the second working distance 146 are illuminated simultaneously in this case. It is thus possible to measure in these two working distances 144, 146 without a process of exchanging or switching over the illumination module 24 by means of the optical sensor 22.

Figure 10:
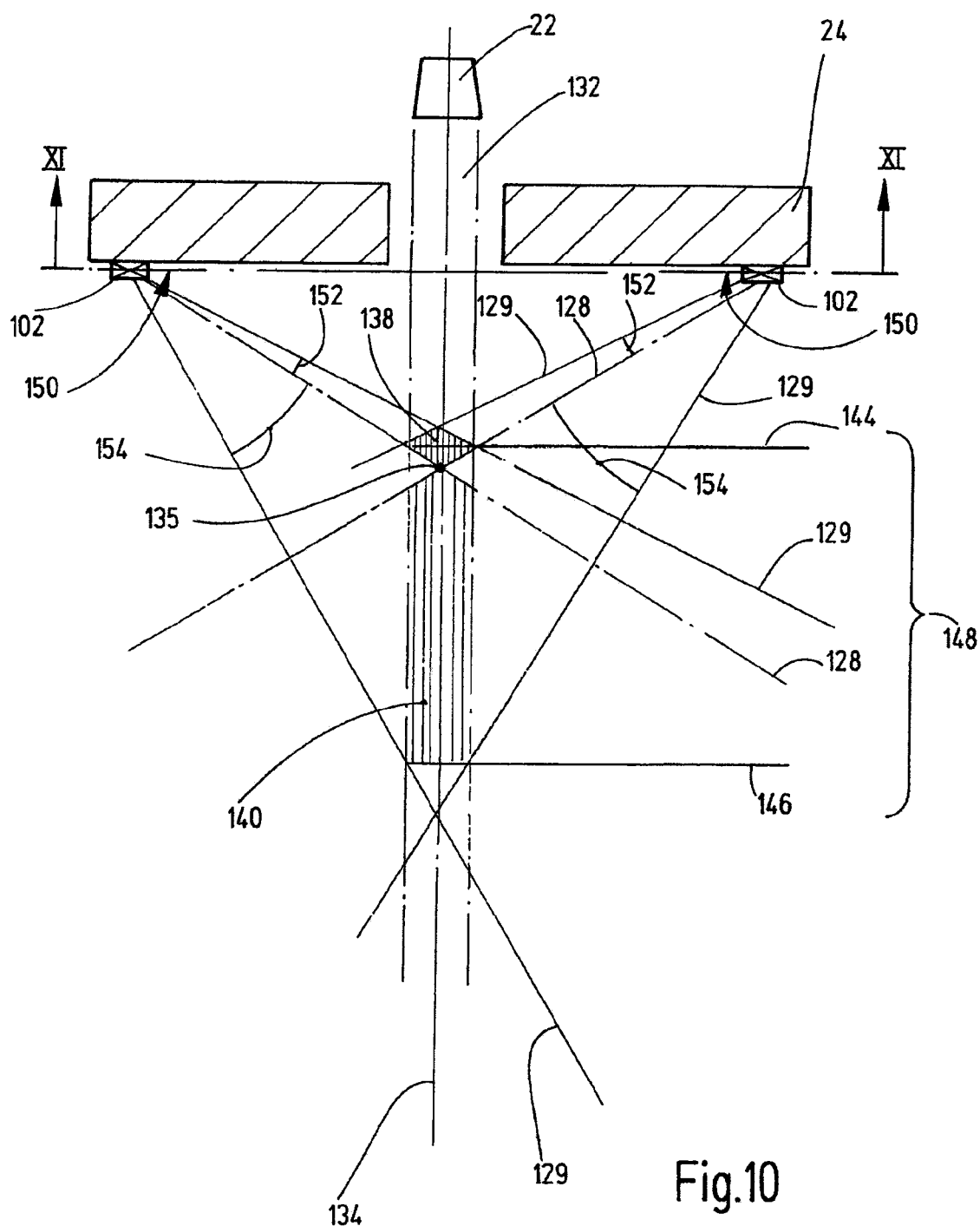
FIG. 10 shows a schematic view of a further embodiment of an illumination module with the emission characteristics of the illumination arrangements.

FIG. 10 illustrates a further configuration of an illumination module and the associated emission characteristics of the illumination arrangements or light sources 102. Identical elements are identified by identical reference signs and will not be explained again hereinafter. Only the differences will be discussed hereinafter.

In the configuration illustrated, the emission characteristic of each light source 102 is modulated by means of a meniscus lens element 150. The surfaces of the meniscus lens element are configured in such a way that a divergence occurs in the second partial region of the emission characteristic of each light source 102. An asymmetry thus in turn occurs in the emission characteristic. The first partial region 152 occupies only a relatively small solid angle, and the second partial region 154 occupies a relatively large solid angle. It goes without saying that this can also be configured precisely the other way round.

In the case of such a configuration, the first working region 138 and the second working region 140 touch one another at the first point 135. In this way, it is possible to set a relatively small first working region 138 with a first working distance 144, which is followed by a relatively large second working region 140. The second working region nevertheless still has light intensities of more than 50%. Therefore, measurements can still be carried out up to a second working distance 146. Furthermore, an intermediate region 148 arises between the first working distance 144 and the second working distance 146, and it is likewise possible to work in said intermediate region. In this regard, a continuous distance transition between the first working distance 144 and the second working distance 146 is possible. It is thus possible to work over a relatively large distance range by means of the optical sensor 220.

Figure 11:
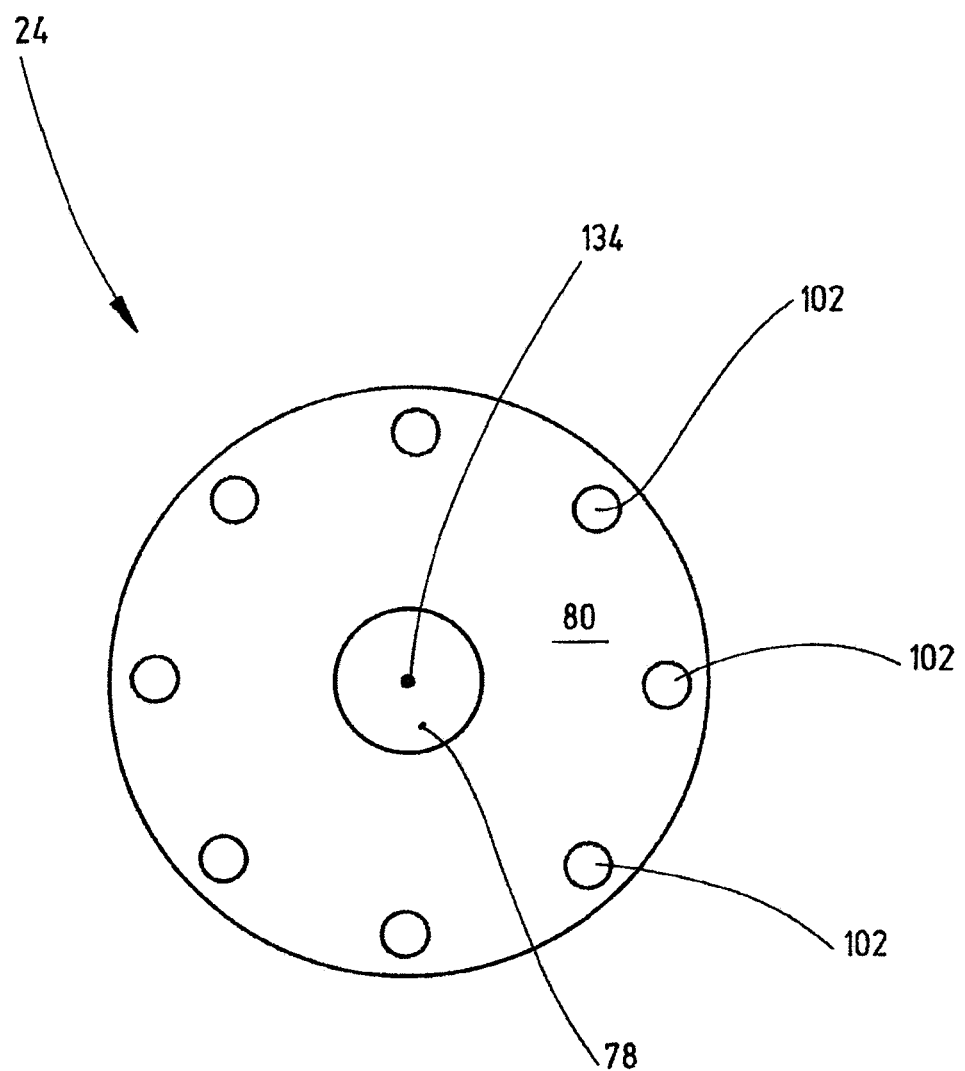
FIG. 11 shows a schematic cross-sectional view along a line XI-XI in FIG. 10.

Finally, FIG. 11 shows in an explanatory illustration a cross-sectional view along a line XI-XI in FIG. 10. The rotationally symmetrical arrangement of the light sources 102 of the illumination arrangements 88 rotationally symmetrically with respect to the axis 134 of rotational symmetry can be discerned. In this case, the light sources 102 are arranged in the edge region 80. The optical sensor 22 can observe the workpiece through the free central region 78 in this case.

Furthermore, the invention may comprise embodiments according to the following clauses:

Clause 1. An illumination module for a coordinate measuring machine for measuring a workpiece by means of an optical sensor, wherein the illumination module comprises a main body having a sensor side and a workpiece side, wherein the illumination module comprises on the main body at least one illumination arrangement for illuminating the workpiece, and wherein the at least one illumination arrangement has an emission characteristic with an emission angle and a light intensity profile within the emission angle, wherein the light intensity profile of the at least one illumination arrangement within the emission angle is asymmetrical.

Clause 2. The illumination module according to clause 1, wherein the light intensity profile of the at least one illumination arrangement is asymmetrical with respect to a direction of a maximum light intensity of the illumination arrangement (88, 104, 106).

Clause 3. The illumination module according to clause 1 or 2, wherein the at least one illumination arrangement has in each case at least one optical element which modulates the emission characteristic of the respective illumination arrangement (88, 104, 106).

Clause 4. The illumination module according to clause 3, wherein the at least one illumination arrangement has at least one light guide (89, 103), and wherein the at least one optical element is arranged at a workpiece-side end of the light guide (89, 103).

Clause 5. The illumination module according to clause 3, wherein the at least one illumination arrangement has a light source, and wherein the at least one optical element modulates an emission characteristic of the light source.

Clause 6. The illumination module according to clause 5, wherein the at least one light source is an LED or an OLED or a laser.

Clause 7. The illumination module according to any of clauses 3 to 6, wherein the at least one optical element is at least one refractive optical element (90, 103, 136, 150) and/or at least one diffractive optical element and/or at least one holographic optical element and/or at least one reflective optical element.

Clause 8. The illumination module according to any of clauses 3 to 7, wherein the at least one optical element has a prism arranged in a partial region of the emission angle.

Clause 9. The illumination module according to any of clauses 3 to 7, wherein the at least one optical element has a meniscus lens element arranged in the entire emission angle.

Clause 10. The illumination module according to any of clauses 1 to 9, wherein the sensor side has a first interface device for the sensor-side coupling of the illumination module in a defined position.

Clause 11. The illumination module according to any of clauses 1 to 10, wherein the main body has the form of a ring having a free central region and an edge region, wherein the at least one illumination arrangement is arranged in the edge region on the workpiece side.

Clause 12. The illumination module according to any of clauses 1 to 10, wherein the illumination module comprises a plurality of illumination arrangements arranged on the workpiece side of the main body rotationally symmetrically with respect to an axis of rotational symmetry, wherein each illumination arrangement has a direction of maximum light intensity, and wherein the illumination arrangements are aligned in such a way that the directions of maximum light intensity intersect at a first point lying on the axis of rotational symmetry.

Clause 13. The illumination module according to any of clauses 1 to 12, wherein in that the emission characteristic of each illumination arrangement is modulated in such a way that it has a first partial region and at least one second partial region.

Clause 14. The illumination module according to clause 13, wherein the emission characteristic of each illumination arrangement is modulated in such a way that it has a first partial region and a second partial region, wherein there is a shadow region between the first partial region and the second partial region, and wherein the first partial regions of the illumination arrangements coincide in a first working region and second partial regions of the illumination arrangements coincide in a second working region.

Clause 15. The illumination module according to clause 13, wherein the emission characteristic of each illumination arrangement is modulated in such a way that it has a first partial region and a second partial region, wherein the first partial region and the second partial region touch at the first point, wherein the first partial regions of the illumination arrangements coincide in a first working region and the second partial regions of the illumination arrangements coincide in a second working region, and wherein the emission characteristic of each illumination arrangement is furthermore modulated in such a way that a direction of a maximum light intensity of the illumination arrangement does not halve the emission angle.

Clause 16. A coordinate measuring machine for measuring a workpiece by means of an optical sensor, comprising an illumination module according to any of clauses 12 to 15, and wherein a measurement cone of the optical sensor runs along the axis of rotational symmetry.

What is claimed is:

1. An illumination module for a coordinate measuring machine for measuring a workpiece by means of an optical sensor having a measurement zone around a sensor axis, wherein the illumination module comprises a main body having a sensor side and a workpiece side, wherein the illumination module further comprises on the main body at least one illumination arrangement including at least one optical element for illuminating the workpiece, and wherein the at least one illumination arrangement has an emission characteristic with an emission angle and a light intensity profile across the emission angle, wherein the light intensity profile of the at least one illumination arrangement across the emission angle is asymmetrical, wherein the emission characteristic of each illumination arrangement is modulated by said at least one optical element so that the emission characteristic has a first illuminated partial region, a second illuminated partial region and a substantially non-illuminated shadow region between the first partial region and the second partial region, and wherein the first illuminated partial region of the at least one illumination arrangement coincides with said measurement zone in a first working region along said sensor axis, wherein the second illuminated partial region of the at least one illumination arrangement coincides with said measurement zone in a second working region along said sensor axis, and wherein the shadow region of the at least one illumination arrangement coincides with said measurement zone in a non-working region along said sensor axis that separates said second working region from the first working region.

2. The illumination module as claimed in claim 1, wherein the light intensity profile of the at least one illumination arrangement is asymmetrical with respect to a direction of a maximum light intensity of the illumination arrangement.

3. The illumination module as claimed in claim 1, wherein the at least one illumination arrangement has at least one light guide, and wherein the at least one optical element is arranged at a workpiece-side end of the light guide.

4. The illumination module as claimed in claim 1, wherein the at least one illumination arrangement has a light source, and wherein the at least one optical element modulates an emission characteristic of the light source.

5. The illumination module as claimed in claim 4, wherein the at least one light source is an LED or an OLED or a laser.

6. The illumination module as claimed in claim 1, wherein the at least one optical element is selected from a group consisting of at least one refractive optical element, at least one diffractive optical element, at least one holographic optical element and at least one reflective optical element.

7. The illumination module as claimed in claim 1, wherein the at least one optical element has a prism arranged in a third region of the emission angle.

8. The illumination module as claimed in claim 1, wherein the at least one optical element has a meniscus lens element arranged in the entire emission angle.

9. The illumination module as claimed in claim 1, wherein the sensor side has a first interface device for the sensor side coupling of the illumination module in a defined position.

10. The illumination module as claimed in claim 1, wherein the main body has the form of a ring having a free central region and an edge region, wherein the at least one illumination arrangement is arranged in the edge region on the workpiece side.

11. The illumination module as claimed in claim 1, wherein the illumination module comprises a plurality of illumination arrangements arranged on the workpiece side of the main body rotationally symmetrically with respect to an axis of rotational symmetry that is aligned with said sensor axis, wherein each illumination arrangement has a direction of maximum light intensity, and wherein the illumination arrangements are aligned in such a way that the directions of maximum light intensity intersect at a first point lying on the axis of rotational symmetry.

12. The illumination module of claim 1, wherein the first illuminated partial region of the at least one illumination arrangement illuminates the first working region at a first working distance, wherein the second illuminated partial region of the at least one illumination arrangement illuminates the second working region at a second working distance, and wherein the second working distance is further away from the optical sensor than the first working distance along said sensor axis.

13. The illumination module of claim 1, wherein said illumination module comprises at least two illumination arrangements arranged on the workpiece side of the main body symmetrically about an axis of rotation that is aligned with said sensor axis.

14. The illumination module of claim 13, wherein the first illuminated partial region of one of said at least two illumination arrangements coincides in said first working region with the first illuminated partial region of another of said at least two illumination arrangements, and wherein the second illuminated partial region of said one illumination arrangement coincides in said second working region with the second illuminated partial region of said another illumination arrangement.

15. The illumination module of claim 14, wherein said one illumination arrangement is arranged on said main body of said illumination module at a first radial location relative to said axis of rotation and said another illumination arrangement is arranged on said main body of said illumination module at a second radial location relative to said axis of rotation radially opposite said first radial location.

16. The illumination module of claim 15, wherein both of said one and said another illumination arrangements are arranged on said main body of said illumination module at the same radial distance from said axis of rotation.

17. A coordinate measuring machine for measuring a workpiece by means of an optical sensor having a measurement zone around a sensor axis, comprising an illumination module for the coordinate measuring machine for measuring the workpiece by means of the optical sensor, wherein the illumination module comprises a main body having a sensor side and a workpiece side, wherein the illumination module further comprises on the main body at least one illumination arrangement including at least one optical element for illuminating the workpiece, and wherein the at least one illumination arrangement has an emission characteristic with an emission angle and a light intensity profile across the emission angle, wherein the light intensity profile of the at least one illumination arrangement across the emission angle is asymmetrical, wherein the emission characteristic of each illumination arrangement is modulated by said at least one optical element so that the emission characteristic has a first illuminated partial region, a second illuminated partial region and a substantially non-illuminated shadow region between the first partial region and the second partial region, and wherein the first illuminated partial region of the at least one illumination arrangement coincides with said measurement zone in a first working region along said sensor axis, wherein the second illuminated partial region of the at least one illumination arrangement coincides with said measurement zone in a second working region along said sensor axis, wherein the shadow region of the at least one illumination arrangement coincides with said measurement zone in a non-working region along said sensor axis that separates said second working region from the first working region, and wherein the illumination module comprises a plurality of illumination arrangements arranged on the workpiece side of the main body symmetrically with respect to an axis of rotational symmetry that is aligned with said sensor axis.

18. The illumination module of claim 12, wherein said second working region is spaced from said first working region by said shadow region.

19. The illumination module of claim 18, wherein significantly less light is emitted by the illumination arrangement in said shadow region relative to said first and second illuminated partial regions.

20. The coordinate measuring machine of claim 17, wherein the first illuminated partial region of the at least one illumination arrangement illuminates the first working region at a first working distance, wherein the second illuminated partial region of the at least one illumination arrangement illuminates the second working region at a second working distance, and wherein the second working distance is further away from the optical sensor than the first working distance along said axis of rotational symmetry.

21. The coordinate measuring machine of claim 20, wherein said second working region is spaced from said first working region by said shadow region.

22. The coordinate measuring machine of claim 21, wherein significantly less light is emitted by the illumination arrangement in said shadow region.

* * * * *